United States Patent [19]

Wiklund

[11] Patent Number: 5,721,618
[45] Date of Patent: Feb. 24, 1998

[54] APPARATUS FOR MEASURING THE DIMENSIONS OF LARGE OBJECTS

[75] Inventor: Rudolf Wiklund, Täby, Sweden

[73] Assignee: Dataliner AB, Sweden

[21] Appl. No.: 619,603

[22] PCT Filed: Sep. 28, 1994

[86] PCT No.: PCT/SE94/00894
   § 371 Date: May 30, 1996
   § 102(e) Date: May 30, 1996

[87] PCT Pub. No.: WO95/09345
   PCT Pub. Date: Apr. 6, 1995

[30] Foreign Application Priority Data

Sep. 30, 1993 [SE] Sweden ............ 9303191

[51] Int. Cl.⁶ .................................. G01B 11/00
[52] U.S. Cl. ................................... 356/376
[58] Field of Search .................. 356/375, 376

[56] References Cited

U.S. PATENT DOCUMENTS

| | | | |
|---|---|---|---|
| 4,492,471 | 1/1985 | Wiklund | 356/375 |
| 4,556,322 | 12/1985 | Wickman et al. | 356/375 |
| 4,997,283 | 3/1991 | Danielson et al. | 356/375 |
| 5,251,013 | 10/1993 | Danielson et al. | 356/375 |

*Primary Examiner*—F. L. Evans
*Attorney, Agent, or Firm*—Larson and Taylor

[57] ABSTRACT

The invention relates to measuring apparatus for measuring the dimensions of a large object with the aid of a narrow optical measuring beam directed onto a number of measuring points. A hit indicator unit is placed in connection with each measuring point. The apparatus includes rail which can be placed adjacent the object to measured and which carries a measuring carriage which is movable along the rail and which directs the direct the narrow optical measuring beam at an angle relative to the measuring path in an object reference plane. The carriage is moved rectilinearly along the rail. Each hit indicator unit coacts with an indicating arrangement which automatically indicates a hit by measuring beam. The carriage is provided with an automatically indicating rail-position sensor and the indications given by the sensor are read-off with each automatic hit indication through the medium of the indicating arrangement.

18 Claims, 7 Drawing Sheets

APPARATUS FOR MEASURING THE DIMENSIONS OF LARGE OBJECTS

FIELD OF THE INVENTION

The present invention relates to measuring apparatus for measuring the dimensions of a large object with the aid of a narrow optical measuring beam directed onto a number of measuring points.

BACKGROUND OF THE INVENTION

The measurements of vehicle chassis are determined by means of methods in which a measuring unit which is moveable along a measuring rail is caused to direct a laser measuring beam onto measuring points on the vehicle chassis. The position of the unit along a vertical scale on the measuring rail is read-off against each measuring point on the chassis. This measurement value is fed into a memory store and is subsequently processed in a computer, for instance a personal computer or a minicomputer having sufficient data processing capacity to make the calculations required. The measurement values are computer processed and presented as absolute values together with the extent to which these values deviate from a corresponding values obtained when measuring against a standard vehicle of the actual model concerned. Consequently, data related to different makes or models of cars are available for loading into the data system used or have already been stored in the fixed memories connected to the computer system. U.S. Pat. No. 4,556,322 describes an arrangement for taking such measurements from solely one measuring rail placed adjacent the car or vehicle to be measured. U.S. Pat. No. 4,492,471 describes a simplified calibration of the system. However, the problem with the known methods is that it is not possible to also measure vertically (i.e. along a Z-axis) quickly and automatically. Manual calibrations, installations and measuring processes take a long time to effectuate and require extensive knowledge of the measuring system used.

SUMMARY OF THE INVENTION

The main object of the invention is to provide a method which will enable large objects, for instance a car chassis, to be measured fully automatically.

Another object of the invention is to provide a method which requires no special installation and calibration of the measuring apparatus in relation to the object to be measured.

Still another object of the invention is to provide a method which enables an object to be measured automatically in three dimensions.

Still another object of the invention is to provide a method which has good penetrating ability at different measuring points when measuring from a measuring rail, i.e. it shall be possible to reach all vehicles measuring points with a measuring beam from the measuring rail.

BRIEF DESCRIPTION OF THE DRAWINGS

The invention will now be described in more detail with reference to the accompanying drawings, in which.

DETAILED DESCRIPTION OF THE PREFERRED EMBODIMENTS OF THE INVENTION

Figure 1:
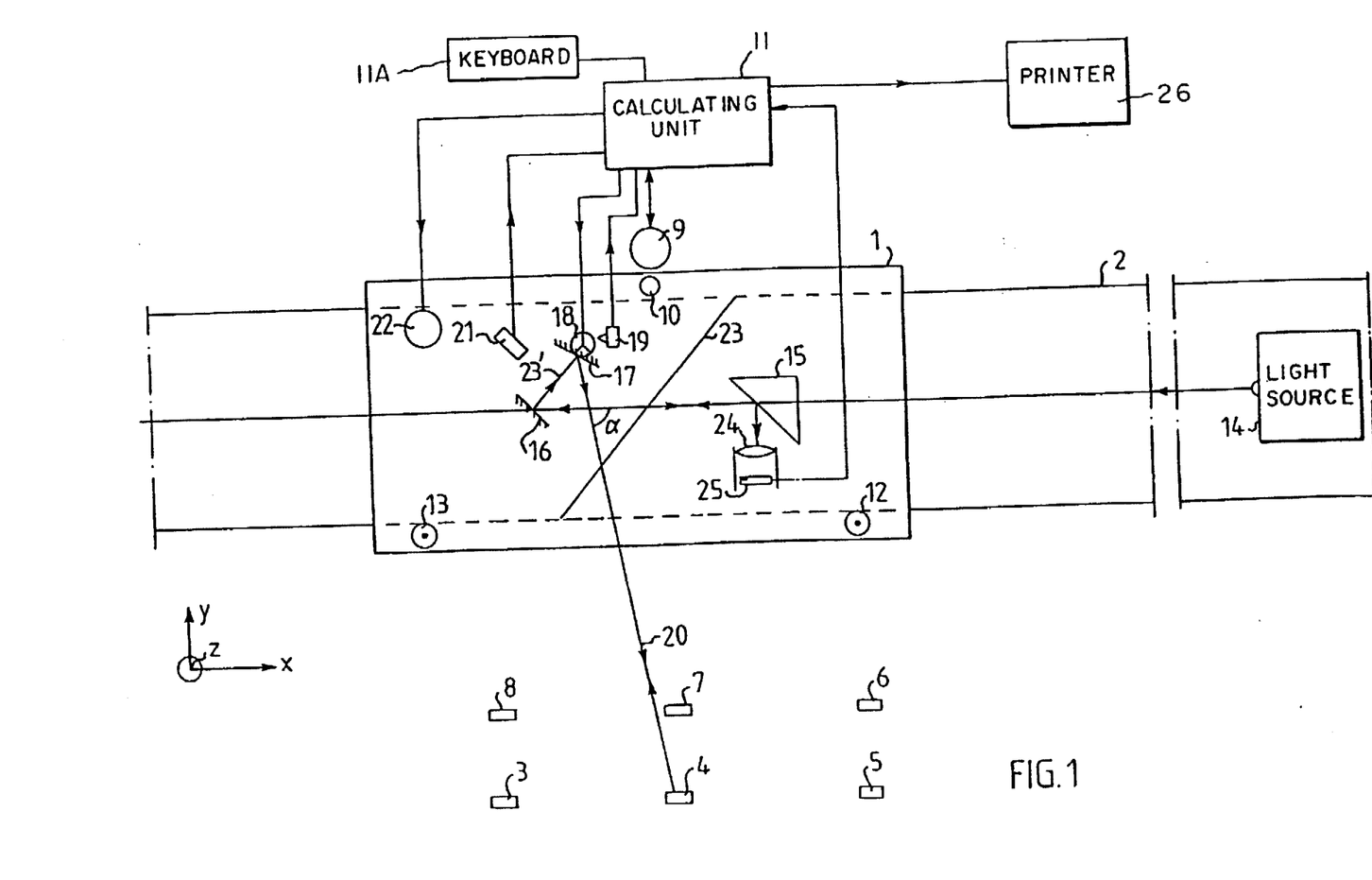
FIG. 1 illustrates a carriage which moves along a measuring rail and which includes a first embodiment of a measuring system in accordance with the present invention.

FIG. 1 illustrates a carriage 1 which is movable along a measuring rail 2 which functions as a measuring path. This measuring rail is intended to be placed adjacent an object to be measured, for instance a car. The object to be measured is provided with measuring devices 3–8 by means of which the impingement of a light beam, preferably from a laser in accordance with the invention, on a measuring point can be indicated automatically, such impingement being referred to as a "hit" at times. The measuring devices may either have at least one reflecting field for reflecting back transmitted radiation, or may be provided with radiation indicators. However, as explained in more detail below, the measuring devices are preferably provided with scale patterns which include reflecting and non-reflecting parts, optionally provided on so-called rules which hang down from suitable measuring points on the object to be measured. This latter applies in particular when the object to be measured is a car chassis. The scale patterns may also be applied to the object to be measured in the form of stick-on sheets, for instance.

The carriage 1 is driven in either direction by a motor 9, which drives a rubber wheel 10 or some other suitable drive arrangement between the measuring rail 2 and the carriage 1 on one side thereof. The motor 9 is controlled by a control unit 11 so as to drive the carriage 1 along the rail in one direction or the other, i.e. in the X direction, via the wheel 10. Mounted between the rail and the carriage, on the side thereof opposite to the side on which the wheel 10 is mounted, is a pair of freely-rotating wheels 12, 13 which support and fix the carriage transversely to the rail and also vertically, i.e. in the Y direction and Z direction.

As will be apparent from the following description, the carriage 1 can be driven backwards and forwards along the rail 2 once or several times, along the full length of the object to be measured, or alternatively the carriage can be moved from position to position along the rail 2, where a hit on a rule is indicated and for each hit-registering position can be moved forwards and backwards some decimeters beyond this position a number of times, to positively determine the rail position, and then moved to the next position at which a hit is indicated, and so on, or alternatively, the carriage can, particularly when a hit of a scale pattern has been indicated, but also constantly instead, have one of its parts in the beam emitting unit rotating and either move the carriage back- and forth along the rail or have it stand still during a fine determination of the position of the found indicating means 3 to 8.

The control unit 11 is preferably a computer, for instance a microcomputer of conventional kind in which software has been stored. The control unit may be manoeuvered by an operator through the medium of a keyboard 11A or the like. The software chosen will be appropriate to the intended use of the measuring apparatus. The measuring apparatus can be moved simply backwards and forwards along the full length of the car when checking the measurements of cars in conjunction with annual inspections, for instance. When straightening out a damaged car, it may be suitable instead to monitor the positions of a number of measuring points during the actual straightening operation, by moving the measuring apparatus forwards and backwards beyond precisely those positions on the measuring rail at which a hit on the rules is registered. The inventive method is thus flexible, since a plurality of the embodiments described can be used selectively and alternatively to one another.

A light source 14 having a narrow beam path, preferably a laser, is placed on one end of the rail 2 and directed so that the beam path from the light source 14 will move along the rail. The beam path moves transversely through a right-angled prism 15 having one side surface extending transversely to the beam path from the beam source in the direction of incidence.

The beam path then impinges on one mirror 16 in a pentagon-type mirror arrangement. The mirror 16 is fixedly mounted on the carriage 1. The mirror 16 deflects the beam onto another mirror 17 in the mirror arrangement. The mirror 17 can be turned to different rotary positions with the aid of a setting device 18, for instance a stepping motor, controlled by the control device 11. Other arrangements for obtaining different angular positions can be used. Pentagon arrangements of this nature are known to the art and are described in U.S. Pat. No. 4,556,322, for instance.

In the case of the FIG. 1 embodiment, a zero detector 19 detects the relationship between the angle of the stepping motor and the absolute angular position of the mirror. Signals are fed from the zero detector 19 to the control device 11 which controls the motor 18 to obtain desired positions of the mirror 17, through the medium of a servo-control. In this regard, the angle of an outgoing beam 20 will be fixed during a measuring period of the measuring sequence but can be a selected angle $\alpha$ (or $\beta$) chosen between the incoming laser beam and the outgoing beam 20. The angles $\alpha$ and $\beta$ may have any desired values, i.e. the one angle may be acute and the other obtuse, or both may be obtuse or acute. It is also possible, and in many instances suitable, to choose more than two angles during an investigation. When a plurality of measuring points are chosen, these measuring points or indicating arrangements adjacent thereto, such as the measuring rules described below, may lie in obstructed positions at certain selected angles. A high penetration capacity in measuring all selected measuring points is achieved because many different angular positions can be selected.

A sensor 21 senses whether or not the carriage lies horizontally in a direction which corresponds at least approximately to the bisectrix of the pentagon mirror arrangement 16, 17. The sensor is preferably a vertical angle detector whose output signal can be said to correspond to an electronic reading of a spirit level and is delivered to the control device/calculating unit 11. A motor 22, which is able to rotate the carriage about an axis 23, generally at right angles to the bisectrix between the mirrors 16 and 17, is controlled by the control device 11 which servo-controls the motor 22 so that the output signal from the sensor 21 will always be zero. An arrangement of this kind is known from U.S. Pat. No. 4,441,818. In practice, the rail 2 is not completely straight. The servo-arrangement including the elements 21 and 22 eliminates the effects of a non-straight rail when moving the carriage 1.

According to the present invention, the carriage 1 is driven backwards and forwards along the measuring rail. As the carriage moves along the rail, the outgoing measuring beam 20 will impinge on the various rules or adhesive stick-on sheets 3-8, which are preferably provided with measurement scales that have reflecting and non-reflecting parts. When the beam impinges on a reflecting part, light is reflected in the opposite direction to the beam 20, through the pentagon mirror arrangement 16, 17. An aperture diaphragm 23, which may be placed in the beam path between the mirrors 16 and 17 for instance, blocks out all rays of light that are reflected in other directions. The reflected light beam is then deflected by the hypotenuse side of the right-angled prism 15 onto an optic 24, shown schematically as a lens in FIG. 1, which collects the reflected light on a light detector 25.

This arrangement, particularly the pentagon mirror arrangement, consequently deflects reflected light so as to obtain an indication in an immediately opposite direction to the direction of the transmitted light, irrespective of rotation of the carriage, i.e. the light passes along the same optical axis both towards and away from the rules or the adhesive sheets 3-8. Since light will be blocked-out with or without the presence of the diaphragm 23, partially due to the finite extension of the mirrors and partially due to the lateral limitation of the lens 24, the diaphragm 23 may be excluded. In order to obtain a sufficiently large output signal, the detector 25 is made sufficiently large to ensure that the light will not be dimmed thereby.

FIGS. 2-9 illustrate different embodiments of rules having scale patterns and suspended from measuring points on the object to be measured, or applied thereto in some other appropriate manner, for instance adhered thereto in the form of an adhesive stick-on strip which includes reflecting and non-reflecting parts. The various rules are arranged so that the height position of a measuring beam impinging on the rule can be determined on the basis of the configuration of the signal that is obtained from the detector 25 as the carriage 1 moves along the object to be measured and along the rail 2 during a measuring cycle.

Figure 2:
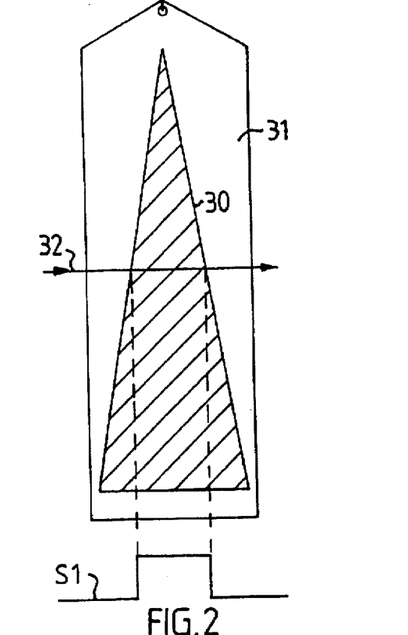
FIGS. 2–9 illustrate different embodiments of a reflector device placed at a measuring point.

FIG. 2 illustrates the scale pattern of a reflecting part 30 of the rule 31 in the form of an isosceles triangle, with the base facing downwards. The signal S1 that is obtained when the beam path 20 moves over the rule 30 is, in this case, a pulse which has different time durations for different heights. The time duration, or time length, however, is correlated against the linear scale on the rail 2, and consequently it can be considered to represent a length measurement. Naturally, the triangle may also be turned upside down and still perform the same function.

Figure 3:
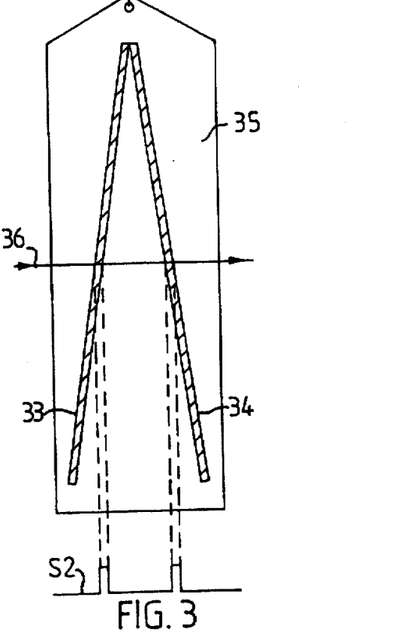

FIG. 3 illustrates the scale pattern of two reflective parts 33 and 35 of the rule 35. The reflective parts 33 and 34 are in the form of ribbon or strips placed along the sides of equal length of an isosceles triangle. In this case, the signal S2 obtained when the beam path 16 moves over the rule has the form of two pulses with a pulse interspace which is different for different heights.

Figure 4:
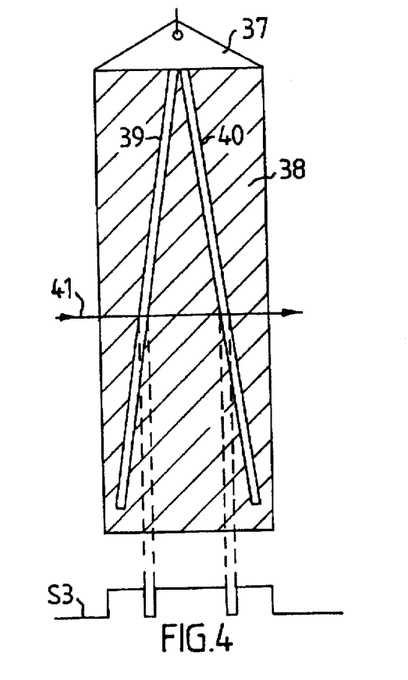

The rule 37 of FIG. 4 is covered almost completely by reflective layer 38. This layer includes two non-reflecting parts 39 and 40 which have the form of strips placed along the sides of equal length of an isosceles triangle. The signal S3 that is obtained when the beam path 41 moves over the rule includes, in this case, three pulses with a centre pulse which is different for different heights. The specific pulse form obtained clearly indicates that a scale pattern has been impinged upon by the light beam.

Figure 5:
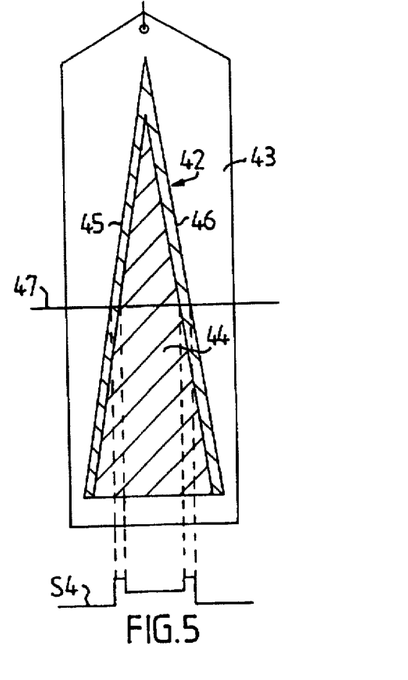

In the FIG. 5 embodiment, the reflective part 42 of the rule 43 is configured as an isosceles triangle with the base facing downwards. An inner triangle 44 in the reflective part 42 has a lowered reflection ability, achieved with silkscreen printing, for instance, in rows over the reflective surface. In this case, there are obtained two highly reflective side-bands 45 and 46 placed along the legs of equal length of the isosceles triangle and located on respective sides of the part 44 of lower reflective ability. The signal S4 obtained when the beam path 47 moves over the scale pattern is, in this case, in the form of two pulses with a pulse interspace which does not extend down to zero level. This embodiment enables those short pulses which belong together to be readily detected.

FIGS. 6-9 illustrate embodiments of scale patterns which when taken per se can be considered to constitute an own invention with a clear inventive level. These scale patterns may also find other areas of use than that of coacting with the carriage moving reciprocatingly along the measuring rail in accordance with the invention. Each of these embodiments has a reflecting background with applied parts of non-reflective material, for instance in the form of dull-black pigment or adhered dull-black strips. A non-reflecting part which has a longer extension in the direction in which the measuring beam passes over the scale pattern than any one of the inner non-reflecting parts applied to the rule is provided along at least one side edge, preferably along both side edges of the scale pattern. Because the side-parts are relatively wide, for instance have a width of 5 mm as opposed to a width of 2 mm in the case of the inner non-reflecting paths, it is easy for the calculating unit 11 to distinguish between edge-parts and measuring-parts in a scale pattern. Furthermore, it is easy to detect whether or not a scale pattern is partially hidden and whether or not measuring needs to be carried out at another angle α or β in relation to the rail 2.

When the measuring beam moves freely in space as the carriage 1 moves along the rail 2 without impinging on a rule, reflections will be obtained from the surroundings, causing the light rays detected by the detector 25 as the carriage moves along the beam to be relatively varied. By including a fully black part at the beginning of a sweep over a scale pattern, there will be obtained a sub-signal which is close to zero for a given period of time, therewith indicating that a measuring beam has begun to sweep over a scale pattern and that measuring of a new scale pattern has begun. This indication is also needed should a rule provided with a scale pattern be partially obstructed by some other rule or by some other object. The non-reflecting edge-parts are made broader than the remaining non-reflecting parts simply to enable these edge-parts to be distinguished from the remainder by virtue of the pulse lengths of the detector signal obtained.

Figures 6, 7:
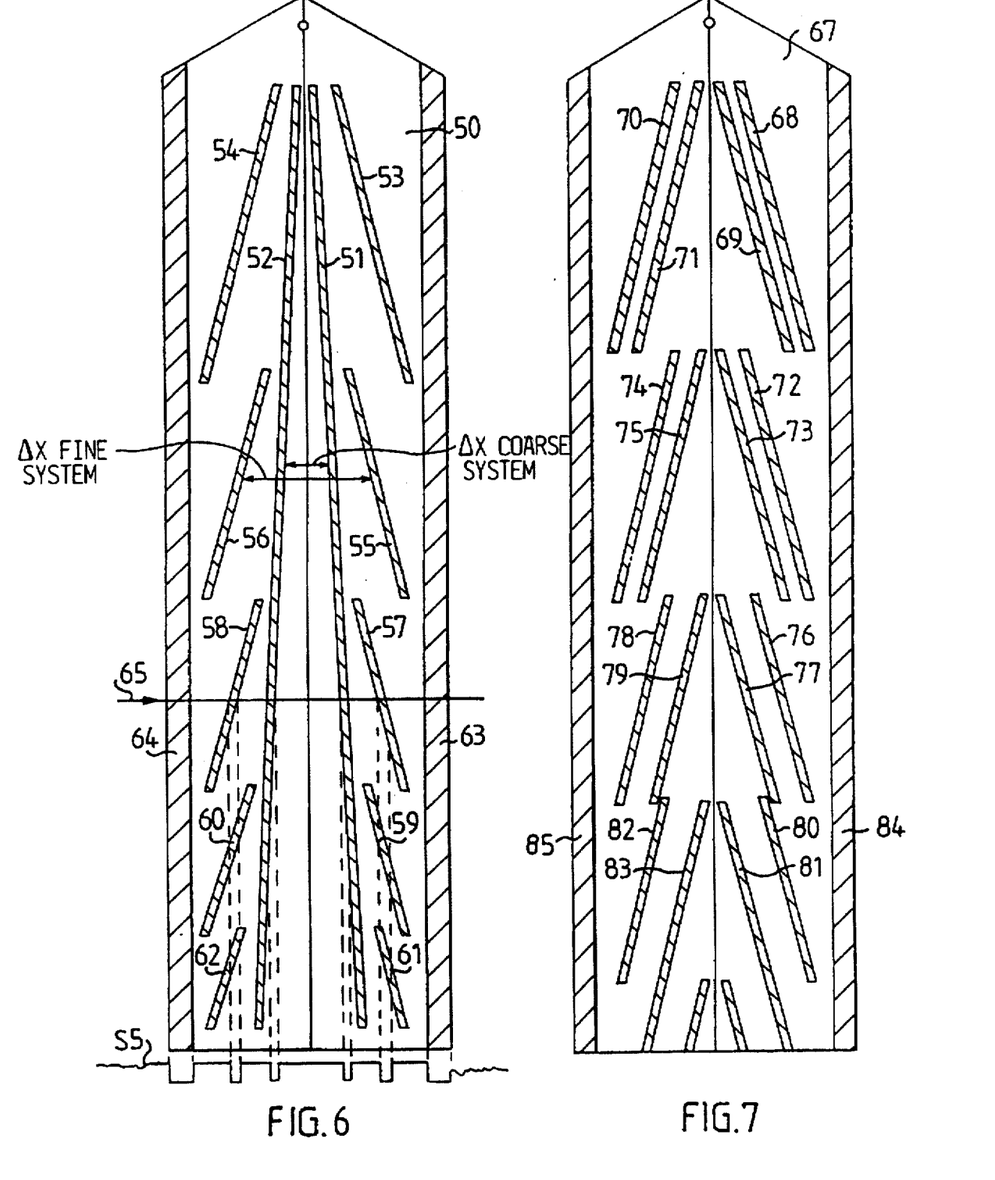

The rule scale pattern is preferably made symmetrical around the centre line of the rule. This will provide particularly clear information as to whether the scale pattern is obstructed or not. A pulse pattern which is received from the detector 25 and which does not consist of two mutually mirror-image pulse-pattern halves will indicate that the scale pattern is partially obstructed and should not be used to determine the position of a rule or like measuring device. FIGS. 6 and 7 illustrate two embodiments of symmetrical scale patterns. The pulse widths obtained are fully correlated with the distances travelled by the carriage 1 along the rail 2. The width, or breadth, of the non-reflecting side-edges are fully known and determined, for instance 5 mm. This enables a non-straight rule to be detected, i.e. a rule which does not extend parallel with the rail, so that a scale correction can be made in respect of this rule. Because the width of either the side-edge or the scale pattern is known, the detected height can be corrected, because the measured width divided by the measured height is equal to the known width divided by the correct height.

FIG. 6 illustrates a special embodiment of non-reflecting parts of a rule 50 having a reflecting background to provide both a rough estimation of the height and a fine appreciation of the height within a number of rule sections. Two non-reflecting strips 51 and 52 are placed obliquely and in mirror image in relation to one another and in relation to a centre line. The strips 51 and 52 extend over practically the whole length of the rule 50 and form a rough estimation system. In order to enable a finer sub-division to be obtained than is possible with the strips 51 and 52, which have a relatively small slope in relation to the centre line of the rule 50, the scale pattern on the rule is divided into a number of sections along its length, where each section has two obliquely positioned non-reflecting strips 53, 54; 55, 56; 57, 58; 59, 60; 61, 62 of a much greater slope to the centre line than the strips 51, 52. Each non-reflecting, broad strip 63 and 64 is mounted on a respective edge of the scale pattern. The signal S5 obtained when the beam 65 moves over the rule 50 will, in this case, have a pulse sequence of six negative pulses which begin with a broad, start pulse and terminate with a broad stop pulse.

The distance between the start and the stop pulse provides an indication of the time scale of the pulse train S5. The time scale is fully correlated with the length scale on the rail. Even though the carriage 1 (FIG. 1) is moved along the object to be measured at a speed which is determined for each time unit, one or more of the rules may be positioned more or less obliquely, i.e. angled in relation to the measuring rail 2. The start and stop pulses provide an indication irrespective of such conditions. In this case, the calculating unit 11 calculates the height position while taking into account the time scale concerned, correlated with the length scale of the rail obtained with the start and the stop pulses, i.e. a scale calibration is made for each pulse sequence received as a result of impingement of the measuring beam on a rule as the carriage is moved along the rail, before the actual height calculation is made on the basis of the different pulse interspaces in the signal sequence received. This property may, of course, also be applied with the majority of the described measuring rules.

A rough estimation of the height position can be made from the two centermost pulses, the occurrent section of the rule being determined in particular by these pulses. The two pulses located outside the centermost pulses clearly provide a finer calibration of the height position of the beam path 65 on the rule within this section, as indicated by the pulse interspace between the centre pulses.

It will be obvious that a sector can be subdivided in more steps than two. For instance, in respect of the rough estimation, each section may, in turn, be divided into intermediate sections of which each is, in turn, finely subdivided. This results in the addition of further strips in the scale pattern, these strips extending within each intermediate section of the rough estimation section obliquely in relation to the rule centre line with a still greater slope than that shown in FIG. 6 with regard to the strips within each sub-section (not shown).

FIG. 7 illustrates another special embodiment of non-reflecting parts on a rule 67 having a reflecting background such as to provide a rough height estimation and a fine height estimation within a number of sections on the rule 67. This embodiment includes within each section two mutually parallel, obliquely positioned non-reflecting strips 68, 69;

70, 71 and 72, 73; 74, 75 and 76, 77; 78, 79 and 80, 81; 82, 83 on each side of the centre line of the rule 67. A non-reflecting strip 84 and 85 is provided on a respective edge of the rule 67. As in the case of the FIG. 6 embodiment, the signal (not shown) obtained as the beam path moves over the scale pattern on the rule 67 comprises a pulse sequence of six pulses which begin with a broad start pulse and end with a broad stop pulse. Each section has an individual distance between the parallel strips, whereby the section concerned is indicated by the pulse distance between the second and the third negative-going pulse and also between the fourth and the fifth negative-going pulse in the obtained pulse series of six negative-going pulses. The fine calibration within a section is given by the pulse distance between the third and the fourth pulse.

Figure 8:
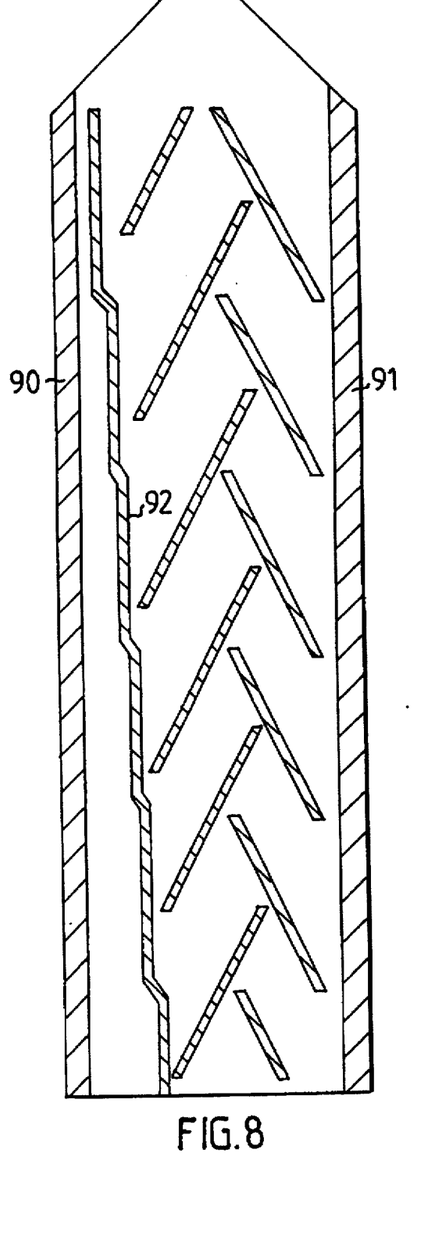
Figure 9:
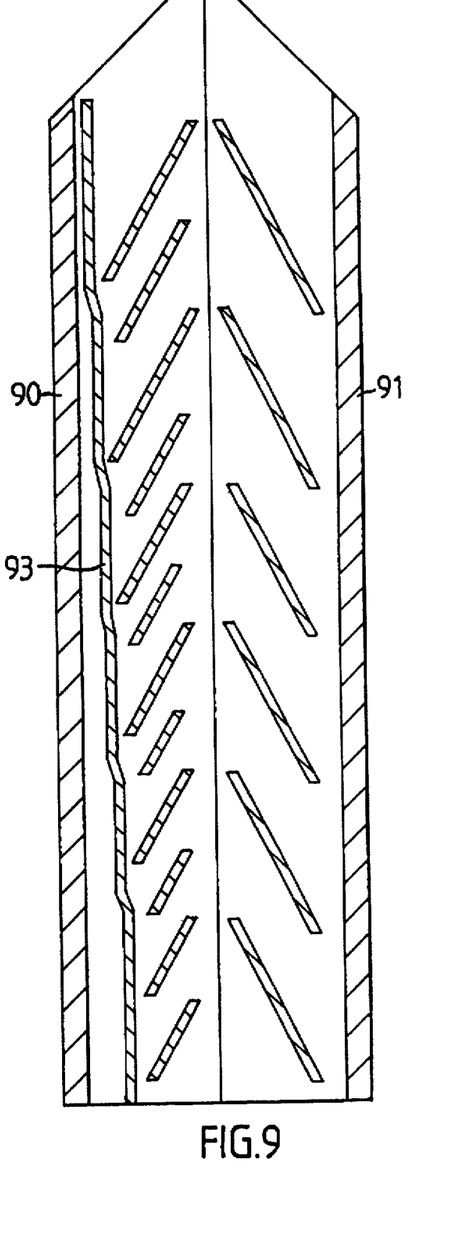

FIGS. 8 and 9 illustrate two variants of rules having a scale pattern which provides a rough estimation and a fine appreciation of the height position. In the case of these variants, however, the scale pattern is asymmetric around the rule centre line. These embodiments also include a respective non-reflecting strip 90 and 91 provided on a respective edge of the rule to provide the time scale and an indication that the measuring beam has impinged on a scale pattern. Both embodiments are divided into sections along their respective lengths. A non-reflecting strip 92 and 93 is placed close to the start strip 90 and is positioned so as to be parallel with the start strip within each section, but is deflected step-wise at the section boundaries so as to be spaced further from the start strip at the different sections. This provides an indication of the section over which the beam passes in a simple manner. Each section can then be divided into sub-sections and an indication of the sub-section within which the beam moves is obtained by making the number of negative-going pulses different for different sub-sections, for instance two or three pulses for different sub-sections. FIGS. 8 and 9 illustrate examples of two different embodiments of patterns of non-reflecting parts on a reflecting background to achieve this end.

The measuring height shall be seen in relation to the rule suspension point, i.e. in relation to the measuring point. The scale pattern is adapted to the length or distance from the measuring point and is fully determined in relation to this length or distance. Consequently, sheet-like stickers bearing scale patterns and stuck onto the rules must be clearly marked to show where the measuring point in question shall be placed in relation to the measuring sticker or sheet.

Figure 10:
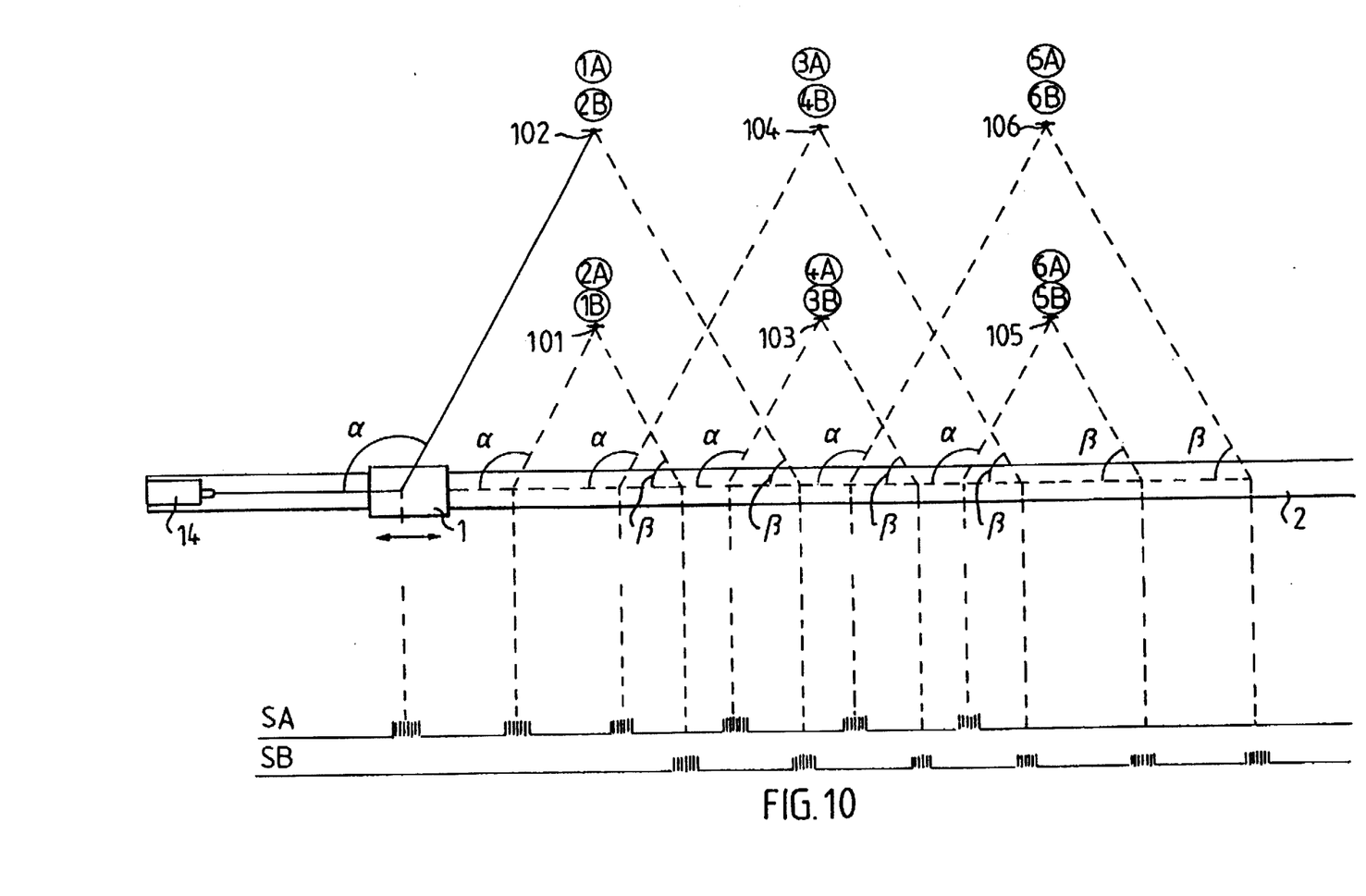
FIG. 10 illustrates one embodiment of the pattern of movement of a measuring beam directed onto the object to be measured.

FIG. 10 illustrates the rail 2 and the carriage 1 and the light source 14 from above. The carriage 1 is moved rectilinearly forwards and backwards along the rail 2, as indicated by the arrow.

The object to be measured is illustrated solely by its rules 101–106, which preferably hang from particularly selected measuring points with regard to the object to be measured.

At least five different embodiments for passes of the unit along the rail during a measuring operation can be obtained:

First Embodiment

During a first period of a complete measuring sequence, the pentagon arrangement (16, 17 in FIG. 1) is set to a first angular position α for the beam path deflected onto the object to be measured. The carriage is moved automatically or manually at least once along the object, wherein the signal SA shown at the bottom of FIG. 10 is obtained, i.e. a pulse train comprising a number of pulses is obtained each time the beam path moves over a measuring scale pattern. During a second period, the pentagon arrangement is set to a second angular position β for the deflected beam path. The carriage is again moved automatically or manually at least once along the object to be measured, and the signal SB shown at the bottom of FIG. 10 is obtained.

Second Embodiment

It is only necessary to move the carriage 1 once along the rail 2 in each measuring cycle in order to obtain a relatively good estimation of the positions of the measuring points. However, a much more accurate result can be obtained when the carriage is moved backwards and forwards along the rail a number of times and the calculating unit 11 calculates a mean value from the data obtained from all passes of the carriage along the rail each time the measuring beam impinges on a rule. This may be particularly suitable when the carriage is driven automatically. Setting of the pentagon arrangement 16, 17 may also be effected fully automatically.

Third Embodiment

Instead of moving the carriage backwards and forwards along the full length of the rail in each working cycle, each time the calculating unit 11 indicates a hit on a rule or scale pattern by analyzing the pulse signals received from the detector 25, the carriage may be moved backwards and forwards through a distance of some decimeters, e.g. three decimeters in one and the other direction, to just beyond the location where the hit was registered and a mean value can be calculated from the different pulse positions in the signals obtained thereby. The carriage can then be moved until the next hit is indicated and the carriage can again be moved forwards and backwards in this location a suitable number of times, and so on.

In the case of the aforedescribed embodiments, the two-dimensional position of the measuring rule in the X-Y plane is calculated by a geometrical triangle-calculation so as to obtain the coordinates for the apex of a triangle on a rule, wherein the distance along the rail between hits indicated by the signals SA and SB for one and the same rule are used as a base and with knowledge of the predetermined angles α and β. As mentioned in the aforegoing, the inventive concept can also be applied without the use of the special, illustrated scale patterns, in which case only the apex of the triangle in an X-Y plane is calculated in the aforedescribed manner. In this case, no special scale patterns are used, and all that is required is the attachment of reflectors in the proximity of each measuring point, for instance reflectors in the form of fully reflecting rules hung from the measuring points.

The position of a hit in the Z direction is also measured with the aid of the scaled rules or like devices. The calculating unit 11 calculates by analyzing the mutual conditions between the pulses in at least one of the two pulse trains in the signals SA and SB for the scale pattern concerned, in accordance with the principles described above with regard to the different embodiments of rules provided with scale patterns.

Fourth Embodiment

It may also be suitable to consider or control only a few particular measuring points, for instance, during a car straightening operation. This can be achieved by first measuring all of the car measuring points in a first measuring sequence and then moving the carriage backwards and forwards to just beyond those positions along the rail at which the light beam impinges on the measurement scales of the monitored measuring points. When work on the car is completed, all measuring points on the car can be measured one more time to ensure that all measuring points are correctly positioned, i.e. have not changed their position during the work of straightening the car.

When particularly monitoring only a few measuring points, it may be impractical to employ a triangle measuring process in order to obtain the distance of a rule from the rail with the aid of angular adjustments to the outgoing light beam in a horizontal plane. Consequently, measurements taken on the rules concerned can be taken at different heights on the monitored rules. The outgoing light beam is then raised so as to impinge on a higher part of the rule scale pattern. Either the inclination of the carriage 1 on the rail 2 or the inclination of the pentagon mirror 17 on the carriage 1 is adjusted so that the beam path will extend obliquely to a horizontal plane. The height position of the measuring light beam on the rule is measured in the aforedescribed way. The distance of the rule from the rail 2 can then be determined by angling the beam path upwards and downwards at a predetermined angle, for instance 6°. Naturally, the beam path may be angled upwards and downwards at different angles.

The distance can then be calculated geometrically on the triangle that is obtained with its top angle on the rail 2 and with its base on the rule, the length of which is calculated with the distance between the two resultant height positions when angling the beam path upwards and downwards and with the signal configuration obtained when moving the carriage backwards and forwards along the rail 2. The calculating unit 11 calculates the three coordinates for the two positions obtained on each rule in the aforedescribed manner. In this regard, attention is paid, of course, to the obliqueness ($\alpha$ and $\beta$) of the light beam in relation to the measuring rail in the geometric calculation.

The fifth embodiment

Embodiments having the mirror 17 set at a fix angular position $\alpha$ or $\beta$ during a measurement cycle has been described above. However, it is also possible to have a rotating or oscilating mirror 17 in order to provide a still more efficient measurement of the positions of the scale pattern positions. An embodiment having this feature is shown in FIGS. 11A and 11B.

Figures 11A, 11B:
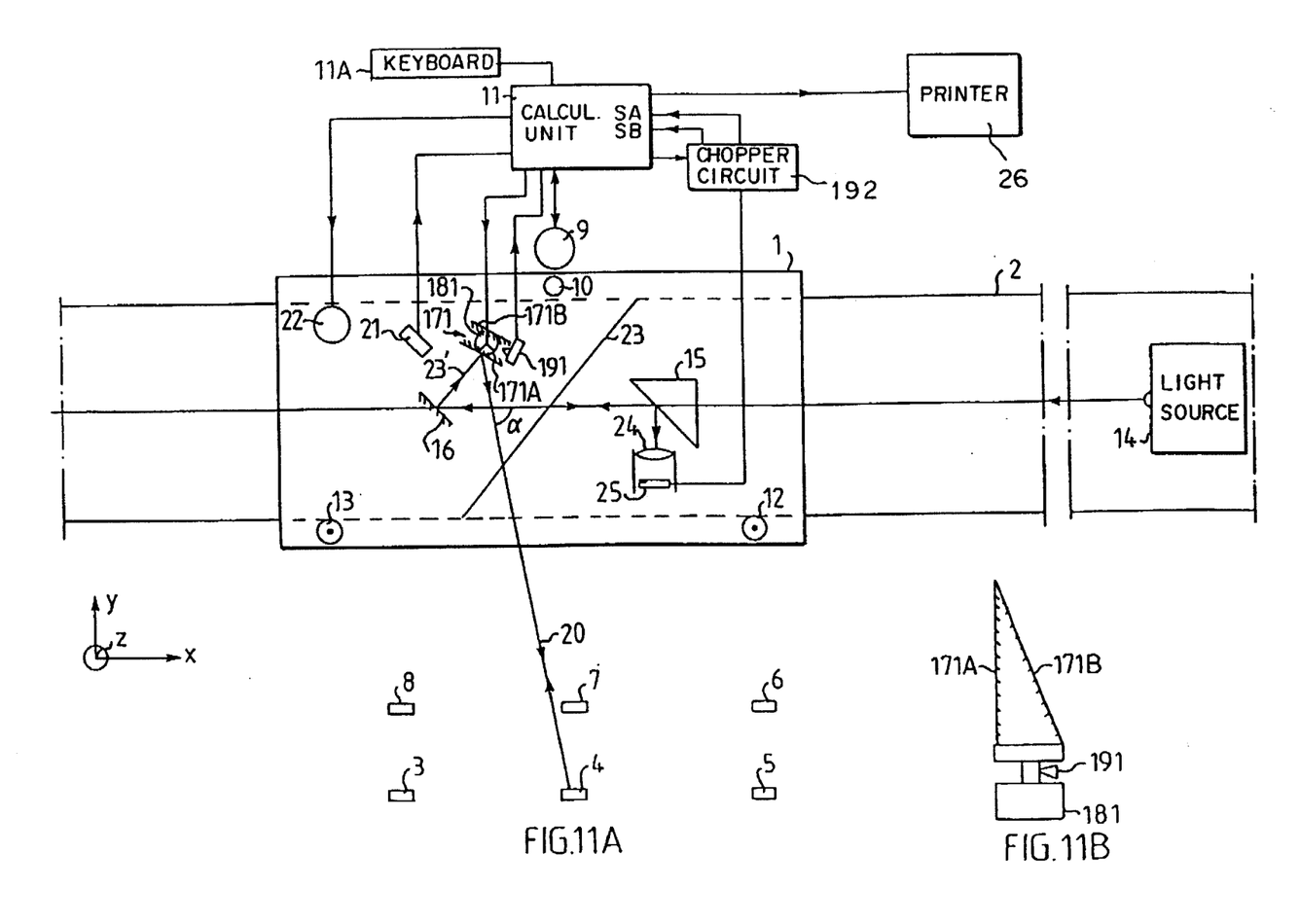
FIG. 11A illustrates schematically a carriage comprising a second embodiment of a measuring arrangement according to the invention.
FIG. 11B illustrates schematically a side view of an embodiment of the mirror device 171 in FIG. 11A in enlarged scale.

As shown in FIG 11B, the rotatable mirror 171, shown in FIG. 11A, can have mirrors 171A and 171B, respectively, mounted with their backs towards each other, at least one of them, 171B, being oblique to a vertical plane. The motor 181 rotates the mirros 171A and 171B. Thus, the light beam from the laser 14 will pass across the scale patterns on the scale means 3 to 8 alternatively at two different heights.

Since it is desirable to have the values from the detector 25 indicated for the chosen angular position $\alpha$ or $\beta$ in the horizontal plane, at least at the coarse search for the scale pattern positions, the computer 11 provides a control signal to a chopper circuit 192 every time one of the two mirrors has an angular position in relation to the chosen angular position as indicated by the angular position meter 191 provided at the motor 181 and fed to the computer 11. The motor speed of the motor 181 is rather high and hence the chopping rate. The signal from the detector will then be somewhat splitt up by the sampling, but that will cause no trouble if the sampling (chopping) rate is high enough. The signal input of the chopper circuit 192 is connected to the output of the detector 25 and feeds the detector signal at control from the computer 11, to a first computer signal input SA, corresponding to a first beam height across a scale pattern, when the first mentioned mirror 171A reflects the laser beam 14, and to a second computer signal input SB, corresponding to a second beam height, when the second mirror 171B reflects the laser beam 14.

Another way to provide two beams having different heights on the scale patterns is to include a beam splitter (not shown) in the beam path from the laser 14 splitting the laser beam into two beams having a slight angular deviation in relation to each other, e.g. about 7°. The beam splitter can split the beam such that the outgoing beams have different polarization. The detector 25 can then be a detector sensible for the different polarizations, so that measurements of impinging light of the first polarization will be provided at a first output and those of impinging light of the second polarization will be provided at a second output of the detector. Instead of having different polarized light beams, the beams could be modulated with different frequencies and thus be individually detectable in the output from the detector and hence be fed to their respective inputs SA or SB of the computer 11. Then, the mirror 171 (in FIG. 11A) could be a single mirror and can be driven to oscillate back and forth between two different angular positions. In this case the two height positions of the beam paths across the scale patterns are provided simultaneously, and the scanning path provided at the rotation of the rotatable mirror 171 will be essentially shorter than if the mirror is rotated a whole turn around.

Two different ways of operation for the fine search can be provided:

1. The sampling is always made at the set angular position $\alpha$ or $\beta$, and the z-position and the x,y-position (as described for the fourth dembodiment) or the possible oblique position of the scale pattern (or both if three rotating mirrors are provided) are derived only taking the carriage positions on account, when the carrage is running along the rail. The running speed of the carriage along the rail may be lower when providing the fine search.

2. The sampling is made at the set angular position $\alpha$ or $\beta$, when the carriage is running along the rail and the coarse positions of the scale patterns are searched for, and then the x-, y-, z-positions and possibly the oblique position of the scale pattern are derived only taking the carriage positions on the rail on account. However, when the coarse position of a scale pattern is found, the fine search is made such that either the sweeping beams are provided across the scale patterns while the carriage is still running along the rail, or to bring the carriage to a momentary standstill in order to have the fine position indication of the scale pattern in question only using the rotation of the mirror device 171 to provide the two sweeping beams across the scale patterns. During the fine search the signal from the detector need not be sampled in another way than to differ between the signals due to reflections from the different mirrors 171A and 171B, respectively, when using that embodiment, so that the signal from the detector 25 is fed adequately to the computer signal inputs SA and SB for angular positions on each side around the set angular position. However, sampling with high sampling rate could be provided as well.

In this way the height and the possible oblique position of the scale pattern will be provided simultaneously, and a fine height position can be made fast and with a good resolution.

While it is described above that two mirrors can be provided on the motor 181, it is in the scope of invention to have more than two mirrors provided as faecets on a rotating drum and having different oblique positions to a vertical plane, as indicated above. The chopping circuit 192 with its control can of coarse be provided as a part of a program in the computer 11.

Calculating Principles

The geometrical calculation principles are in themselves well known to the skilled person and need not be described in detail anywhere in the present document. The time points at which the light beam impinges on non-reflecting and reflecting material on the rules are fed into the calculating unit 11, as is also an indication of the current position of the carriage along the measuring rail with each hit or impingement. In the case of the FIG. 1 embodiment, this is achieved by the motor 9 although it will be understood that any suitable type of position indicator suitable for this purpose may be used.

Many different types of position indicating devices are known to the art. Indicated hits which correspond to the same part of each rule, for instance the start strip of the embodiments illustrated in FIGS. 6–9, are used to calculate the position of the carriage 1 along the measuring rail 2 on the occasion of a hit.

One problem that can occur is that the scales obstruct one another. This problem is solved by relating the position point measured to a predetermined anticipated position, with given tolerance limits. For instance, when measuring a car chassis there are used measurements that have earlier been made on a standard car of the same model or make. These measurements can be stored in a memory in the calculating unit 11. Since the object to be measured may be placed obliquely in relation to the measuring rail, and since the object to be measured may also be inclined to the horizontal plane, it should be observed in this regard that it is the total measurement picture of the hits or impingements that provides information concerning the anticipated positions.

If a measured position deviates excessively, i.e. deviates more than the tolerance determined for the position indication, the measurement obtained for this position is excluded. If the information obtained with regard to the dimensions of the measured object is insufficient, the pentagon arrangement 16, 17 is adjusted to another angular position and the carriage 1 is moved along the measuring rail 2 at least sufficiently to pass a position point thereon, which according to the calculation made in the calculating unit 11 in accordance with data given should be the point which will provide a hit on the rule concerned at the new angular position of the pentagon arrangement. There is thus obtained a new "hit picture", i.e. a new pulse train on the impingement occasion and a further possibility of an accepted measurement.

When the calculating unit 11 has calculated all measurement data in accordance with well known geometrical principles, the data can be presented beneficially in printed form by a printer 26 connected to the calculating unit 11 and/or presented on a screen 27 or like device.

The calculating unit may either provide a presentation of the immediately obtained measurement values or may make a comparison calculation with where the different calculated measuring points are placed in comparison with where they would be placed if the car chassis concerned was the chassis of a standard car of the same model or make. In this latter case, the operator superintending the measuring operation will preferably disclose, via the keyboard 11A, which measuring points on the object to be measured shall be considered as reference points in the comparison calculation. There should be three reference points. With the aid of the stored data relating to the standard car, the calculating unit calculates where the remaining measuring points should lie in space and then make a comparison between these positions and the positions actually measured. This can be particularly beneficial when measuring an accident damaged car in conjunction with a car straightening operation. Measurements can be taken after each car straightening occasion and the operator is able to decide on the basis of the measuring result how the next car straightening operation shall be carried out or that the car straightening result obtained is satisfactory.

As will be understood, the inventive measuring apparatus is well suited for checking the measurements of cars in conjunction with annual car testing inspections, for instance, in addition to its application in car straightening operations.

It is also possible to take accurate measurements of an object which is provided with scale patterns that are not mounted on a perfectly vertically hanging rule. For instance, it may be suitable to hang the rules from a semi-fixed friction coupling instead of a practically friction-free universal joint. This makes the scales insensitive to the effect of wind on the measuring site. The measuring process is first carried out in the way described above. The light beam is then either inclined in relation to the reference plane used in the same way as that described above with regard to the fourth embodiment, or the light beam is moved in parallel by inserting a periscope in the beam path on the output side (not shown). The inclination of the rules is then calculated in accordance with known geometrical principles, by making a comparison between the measured height position and the height position that should have resulted from movement of the beam as its height position was changed. Thus, in the case of this embodiment, the position of the rule concerned in relation to the rail is not determined, this being done with measurements in the reference plane at different set angles of $\alpha$ and $\beta$. The aforedescribed fourth an fifth embodiments in which the angles are adjusted upwards and downwards can also be afforded this type of compensation, by introducing an additional upward or downward angling at an angle different to that used to determine the position of the measuring scale in space.

Figure 12:
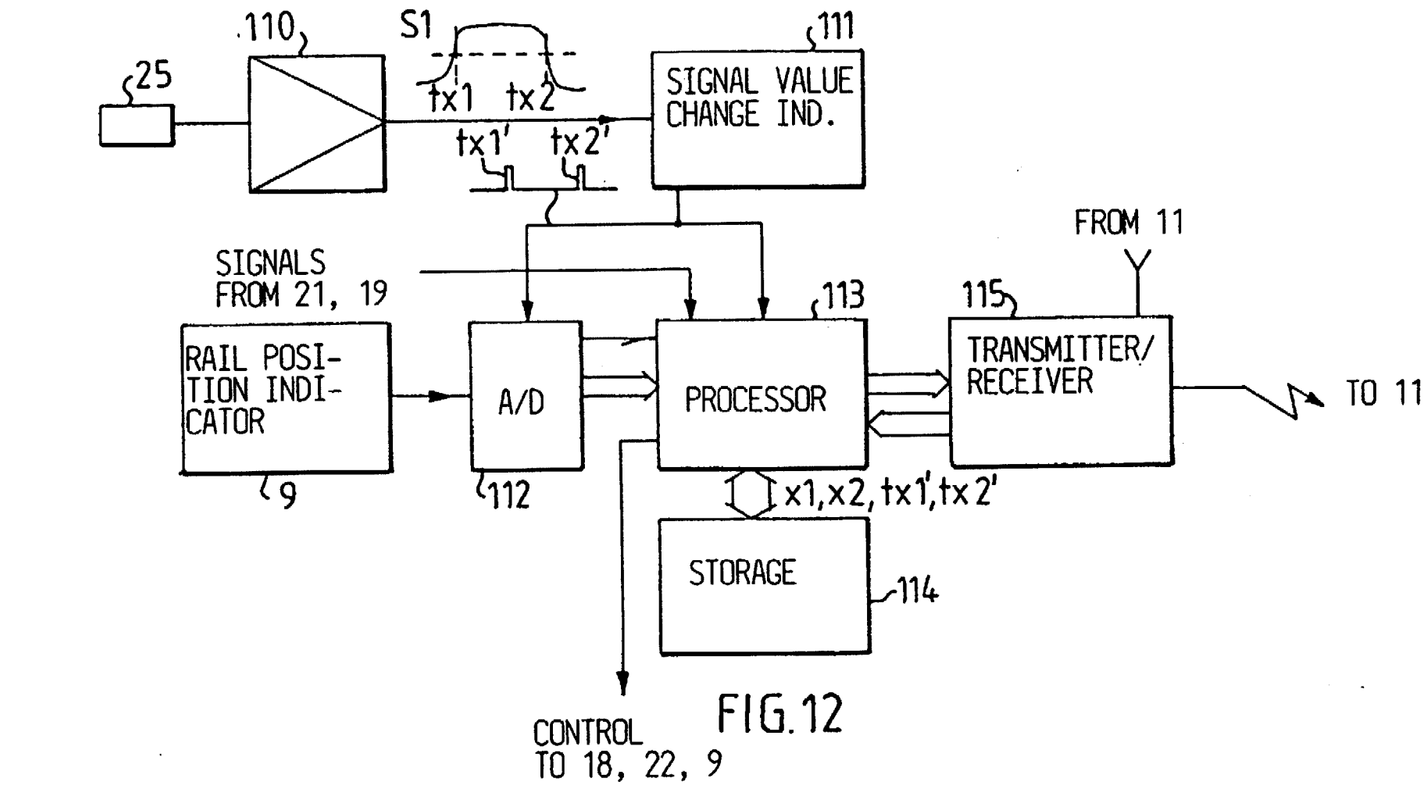
FIG. 12 is a block schematic of one embodiment of a calculation circuit used in accordance with the invention.

The measuring carriage 1 will suitably have its own power supply. Measurement data may conveniently be transmitted between units on the carriage and the calculating unit 11 over at least one IR link directed onto the light source 14 (preferably a laser). It may be suitable to amplify the measurement signals before they are delivered to the calculating unit 11. This amplification can either be effected in the unit 11 or, alternatively, as is preferred, prior to transmitting signals from the carriage to the unit 11. FIG. 12 shows a circuit intended for this purpose. The signal from the detector 25 is amplified in an amplifier 110. It has been assumed in this example that the scale pattern is of the type shown in FIG. 2, producing an output signal S1. The times tx1 and tx2, correlated to carriage positions along the measuring rail 2 when the signal value of S1 passes through a predetermined threshold value in one or the other direction, are indicated by a circuit 111 which delivers a pulse tx1' and tx2' for each transition of the threshold value.

The rail position indicator 9 constantly indicates the position of the carriage 1. These output signals are delivered to the signal input of an analog/digital converter 112. It is also possible to use a direct digital indicating rail position sensor instead of using separate units 9 and 112. The output signal of the circuit 111 is delivered to a trigger input on the analog/digital converter 112, which upon receipt of a trigger signal analog/digital converts the signal on its signal input and delivers the converted signal to a processor 113, optionally together with a trigger signal which activates the processor to receive the output signal from the converter 112. The processor 113 stores the position signals x1 and x2 received at time points tx1' and tx2' in a memory 114 together with the time points, which have also been delivered directly to the processor 113 from the circuit 113 and time-indicated by means of a time circuit incorporated in the processor.

As indicated above, the signals from the units 21 and 19 are also transmitted to the unit 11, and consequently these signals are also delivered to the processor 113, after being analog/digital converted, of course. The processor 113 is coupled to a transmitter/receiver 115 which transmits different data from the processor 113 to the calculating unit 11, preferably in time multiplex form, and receives data from the calculating unit 11 for controlling various units on the carriage, such as the units 18, 22, 9. As will be understood, it is possible, and suitable, to allow the processor 113 to servo-control the motor 22, by direct sensing of the element 21 instead of allowing the calculating unit 11 to serve said element, as illustrated in FIG. 1. The servo-control of the units 18 and 19 can also be achieved by the processor 113.

As will be understood, many variations and modifications are possible within the scope of the invention as defined in the following Claims. For instance, instead of being provided with non-reflecting and reflecting parts, the scales may be provided with parts provided with sensors or detectors which produce a signal when a measuring beam from the carriage impinges thereon. The resultant reaction signal may be transmitted to the calculating unit 11 in some suitable manner, for instance in a cordless manner using radio waves, by IR communication, acoustic waves, etc. The beam displacement device in FIGS. 2 and 11A is shown to be a pentagon mirror arrangement. However a turnable or rotatable prism could be used instead as apparent for the person skilled in the art. Deviations oblique to a horizontal plane could be provided by having for instance at least two pentagon prisms rotatable around an axis of rotation at least one being provided oblique to the horizontal plane, or the like. The main feature of the deviation unit is that it can deviate the beam in different directions in the controllable ways described above. Also, instead of having the two fixed mirrors in FIG. 11B a turnable mirror having adjustable settings oblique to a horizontal plane could be provided.

I claim:

1. A measuring apparatus for measuring dimensions of a large object, said measuring apparatus comprising:
    a measuring carriage movable in a straight line along a measuring path placed adjacent an object to be measured, said path including measuring points thereon, said measuring carriage transmitting a narrow optical measuring beam onto the object;
    hit indicator units positioned in a proximity of each of said measuring points;
    indicating arrangements, coacting with said hit indicator units, for providing an automatic indication of a hit by said measuring beam; and
    an automatic position indicator on said measuring carriage for showing position of the measuring carriage when a hit is made by said measuring beam by means of a control from said indicating arrangements.

2. The measuring apparatus according to claim 1 further comprising a calculating unit for controlling a carriage-drive motor to control the movement sequence of the carriage automatically, the carriage including an angle adjusting means controllable by the calculating unit for adjusting a value of a measuring angle to the measuring path within a reference plane of the object to be measured, each measuring sequence including moving the carriage along the measuring path with the measuring beam angled in at least two angular positions in the reference plane, whereby during a measuring sequence each hit indicator unit is scanned by the measuring beam from at least two directions.

3. The measuring apparatus according to claim 1, further comprising a calculating unit for causing the measuring carriage to move forwards and backwards past each position a predetermined number of times at each position along the measuring path at which an indication is given by the indicating arrangement.

4. The measuring apparatus according to claim 1, wherein each of said hit indicating units includes a reflective device at each measuring point, said apparatus further comprising a beam deflecting arrangement through which the measuring beam is transmitted onto the reflective device, light reflected by the reflective device traveling through the beam deflecting arrangement in a direction opposite to the direction of the measuring beam, and then to a detector arrangement.

5. The measuring apparatus according to claim 1, wherein each of said hit indicator units includes a scale pattern placed in connection with one of the measuring points, the scale pattern being such that the indicating arrangement gives rise to different signal patterns corresponding to different heights of the measuring beam as it scans the scale pattern as the carriage moves rectilinearly along the measuring path.

6. The measuring apparatus according to claim 5, wherein the scale pattern includes reflecting and non-reflecting pattern parts and each of the indicating units includes a reflected-light detector onto which light reflected by the scale pattern is delivered, at least one pattern-part of one scale pattern being configured so that at least parts of said pattern-part extend along two sides of a triangle at the same angle to an at least generally vertical center line of the scale pattern.

7. The measuring apparatus according to claim 5, wherein the scale pattern comprises at least two pattern-parts for providing different grades of fine resolutions of the vertical localization of the measuring beam on the scale pattern during a sweep across the scale pattern, each pattern-part for a particular grade of fine resolution providing an indication of a vertical section along the scale pattern within which the pattern part having the next finer grade of fine resolution will give an indication of its resolution.

8. The measuring apparatus according to claim 7, wherein each of the pattern-parts is divided into a number of sections along a vertical direction thereof, each section comprising at least one pattern-part by which current height of the measuring beam within the identified section is identifiable.

9. The measuring apparatus according to claim 5 wherein each scale pattern includes part-patterns for scale calibration of the signal pattern obtained from a reflected-light detector as the carriage moves along the measuring path.

10. The measuring apparatus according to claim 5 further comprising a calculating unit for checking the signal pattern obtained from the indicating arrangement with stored data relating to an anticipated signal pattern and accepting only signal patterns which fulfill the stored data as the measuring beam sweeps the scale pattern.

11. The measuring apparatus according to claim 1, wherein the measuring carriage includes a servo-controlled inclination adjustment device for maintaining the carriage inclined at such an angle that the measuring beam is held in one and the same direction during a measuring cycle with a fixed, set output angle irrespective of the occurrent position of the carriage on the measuring path.

12. The measuring apparatus according to claim 3, wherein the measuring carriage includes a measuring beam displacement arrangement for changing a reference plane of the narrow measuring beam, the calculating unit being constructed to calculate the coordinates of a hit on a scale pattern when the apparatus is operated with the beam displacement arrangement disengaged and with the beam displacement arrangement engaged.

13. The measuring apparatus according to claim 12, wherein spatial position of the scale pattern in relation to the measuring path is defined with the aid of the calculating unit which causes the beam displacement arrangement to angle the beam path upwards and downwards at predetermined angles to a horizontal plane, the spatial position of the scale pattern being calculated geometrically on the triangle that is obtained with its top angle on the measuring path and its space on a rule, length being calculated by distance between the two height positions obtained when angling the beam path up and down, and by the signal pattern obtained when moving backwards and forwards along the measuring path while taking into account the inclination of the measuring beam in relation to the measuring path in the geometrical calculation.

14. The measuring apparatus according to claim 12, wherein the calculating unit corrects for any inclination of the scale pattern to a vertical plane on a basis of a comparison made between results obtained from two passes of the unit along the measuring path with different beam displacements effected by the beam displacing arrangement.

15. The measuring apparatus according to claim 12, wherein the beam displacement arrangement comprises a rotating part providing a beam scan across said indicator units and includes at least two beam deflecting units of said part in sequence around a rotating axis and having different displacement inclination to a horizontal plane in order to change the reference plane of the narrow measuring beam scan across the scale pattern in sequence after each other.

16. The measuring apparatus according to claim 12, wherein the beam displacement arrangement comprises an oscillating part providing a beam scan across said indicator units and the measuring carriage transmits at least two measuring beams having mutual different angular deviations in relation to a horizontal plane for providing two narrow measuring beam scans across the scale pattern at different heights.

17. The measuring apparatus according to claim 15, wherein at fine indication of the beam position in relation to a particular scale pattern, the carriage is controllable to move more slowly on the path than during a course scan in order to find the mere positions of the scale pattern or to be brought to a standstill letting a moving mirror part provide for the beam scan.

18. A measuring apparatus for measuring dimensions of a large object, said measuring apparatus comprising:

a measuring carriage movable along a path placed adjacent an object to be measured, said path including measuring points thereon, said measuring carriage transmitting a narrow optical measuring beam onto the object, said beam being angled in relation to the measuring plane in an object reference plane;

hit indicator units, each of said units including a reflective device at each of said measuring points; and a beam deflecting arrangement for transmitting the measuring beam onto the reflective devices, whereby light from the measuring beam reflected by the reflective device passes through the beam deflecting arrangement in a direction opposite the measuring beam and then passes to a detector arrangement.

* * * * *